W. J. EHRSAM & L. N. MORSCHER.
THROWING WHEEL FOR GRADERS.
APPLICATION FILED JUNE 17, 1912.
1,072,442.
Patented Sept. 9, 1913.
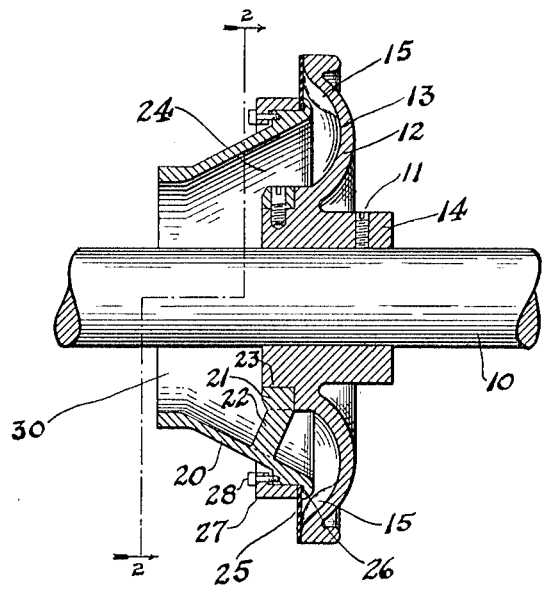
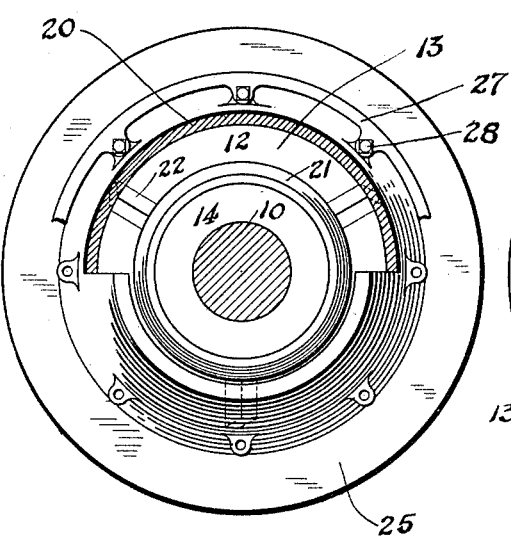
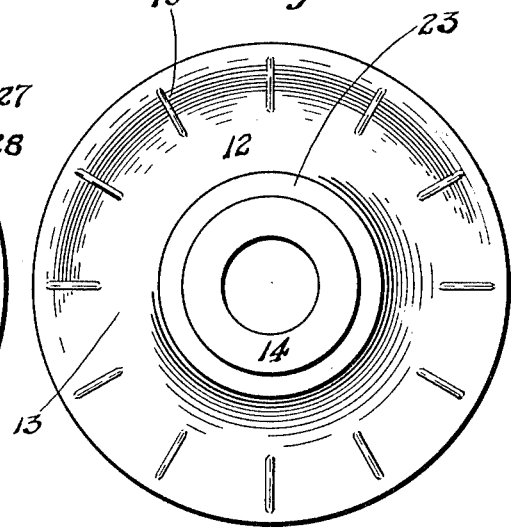
Inventors
William J. Ehrsam
Lawrence N. Morscher,
By Arthur M. Hood
Attorney
Witnesses
Frank A. Fahle
Josephine Gasper

UNITED STATES PATENT OFFICE.

WILLIAM J. EHRSAM, OF ENTERPRISE, AND LAWRENCE N. MORSCHER, OF LAWRENCE, KANSAS, ASSIGNORS TO THEMSELVES, AS COTRUSTEES, OF ONE-HALF FOR SAID MORSCHER AND ONE-HALF FOR THE J. B. EHRSAM & SONS MANUFACTURING COMPANY, OF ENTERPRISE, KANSAS, A CORPORATION OF KANSAS.

THROWING-WHEEL FOR GRADERS.

1,072,442. Specification of Letters Patent. Patented Sept. 9, 1913.

Application filed June 17, 1912. Serial No. 704,246.

*To all whom it may concern:*

Be it known that we, WILLIAM J. EHRSAM, a citizen of the United States, residing at Enterprise, Dickinson county, Kansas, and LAWRENCE N. MORSCHER, a citizen of the United States, residing at Lawrence, Douglas county, Kansas, have invented new and useful Throwing-Wheels for Graders, of which the following is a specification.

Our present invention is an improvement on that shown in Patent No. 976,350, granted November 22, 1910, to ourselves and Ernest H. Sieder, and relates to an improved form of throwing wheel or impeller for use in machines for grading material by means of the action of a deflecting air current upon projected particles having high velocities. It is especially designed for use in an apparatus similar to that shown in the patent to Lawrence N. Morscher, No. 990,157, granted April 18, 1911.

As pointed out in the aforesaid Patent No. 976,350, it is essential, in order that there may be uniformity of separation, that the projection of the particles thrown from the wheel be definite as to direction and uniform as to quantity at any given velocity, so that they may be acted on with definiteness by the deflecting air current, also of uniformly proportionate velocity. It is therefore desirable for the wheel to engage mechanically practically every particle thrown therefrom, so as to give it positive propulsion. This is accomplished in accordance with our present invention by providing the circumferential mouth of the throwing wheel with a flexible lip which is biased to closed position by the action of centrifugal force, but will yield to allow the material to be graded to be thrown out by centrifugal force. This lip will yield unequally for particles of different size, thus enabling the lip to yield locally for large particles while still firmly engaging small particles, even when these are closely neighboring.

The various novel features of our invention will appear from the description and drawings, and will be particularly pointed out in the claims.

In the accompanying drawings, Figure 1 is an axial section through a throwing wheel embodying our invention; Fig. 2 is a section on the line 2—2 of Fig. 1; and Fig. 3 is a front view of the concave disk.

On the shaft 10 is fixed, as by a set screw 11, a disk 12 having a face 13 which is concave between the periphery and the hub 14. The concave face 13 of this disk is provided with radially extending ribs 15 extending from near the outer edge of said face inward as far as desired; in practice, it is generally found sufficient to have them extend inward about half-way. A hollow frusto-conical member 20, with its larger end smaller in diameter than the disk 12 and near the concave face 13 and slightly underhanging the outer edge of such face is carried from the hub 14 of such disk by a ring 21 and a plurality of arms 22, the ring 21 preferably fitting in an annular groove 23 in said hub. This forms a receiving chamber 24, having a circumferential mouth between the disk 12 and the end of the cone 20. A flexible ring 25, preferably made of rubber or leather, is clamped between an outwardly projecting flange 26 on the larger end of said cone 20 and a coöperating clamping ring 27 held in place by screws 28. The ring 25 normally lies flat against the surface 13 of the disk 12 substantially at the periphery 14, and is biased to such position by the action of centrifugal force as the shaft 10 is rotated. That is, the natural resiliency of the flexible ring 25 tends to hold such ring against the outer edge of the surface 13 and this tendency is augmented, or the ring is stiffened, by the action of centrifugal force.

When the shaft is rotated and granular material is fed through the smaller end 30 of the cone 20, it is conducted to the larger end of such cone and against the concave surface 13 by the action of centrifugal force, which continues to act on it, to move it radially along such surface 13. The ribs 15 prevent any substantial slipping between the material and the disk 12. As the material slides outward along the face 13 it engages the flexible ring 25, which yields sufficiently to allow the separate grains to pass through but grips such grains against the disk 12 with sufficient force to cause them to rotate with such disk until definitely thrown away therefrom. Thus the grains leave the disk with a certain definite direction and velocity relative to the throwing wheel for a given speed of the latter for the material issues from the circumferential mouth of the wheel between the ring 25 and the disk in a thin annular sheet of which the various particles are traveling at the moment of issuance in a direction substantially tangential to the periphery 14. The flexible ring 25, allows particles of large size, or even actual lumps, to go through without interfering with the action of the throwing wheel upon particles of smaller size, even though the latter are quite close to the former.

We claim as our invention:

1. An impeller comprising a rotatable disk having a concave surface with a radial component at its outer edge, a hollow cone-shaped member having its larger end near the concave face of said disk, and a flexible ring carried by said cone-shaped member and engaging the outer edge of the concave face of said disk.

2. An impeller comprising a rotatable disk having a concave surface with a radial component at its outer edge, a hollow cone-shaped member having its larger end near the concave face of said disk, and a flexible ring carried by said cone-shaped member and engaging the outer edge of the concave face of said disk, the concave face of said disk being provided with substantially radial ribs.

3. An impeller comprising a pair of rotary co-acting members forming a receiving chamber between them and having their adjacent ends slightly spaced from each other to leave a circumferential substantially-radial peripheral opening between them at their outer edges, and a flexible ring carried by one of said members and closing said opening by overlying the adjacent periphery of the other member.

4. An impeller comprising a pair of rotary co-acting members one of which has a concave surface and is slightly larger than the other, said concave surface having a radial component at its outer edge and a ring of flexible material carried by the smaller member and lying against the outer edge of the concave surface of the larger member by the action of centrifugal force.

5. An impeller comprising a disk-shaped member having one face which is concave between center and periphery with a radial component at its periphery, a member coöperating with said disk and smaller in diameter to form a chamber which will feed to the outer part of such concave surface by the action of centrifugal force, and an annular member of flexible material carried by said smaller member and lying against the outer edge of said concave surface by the action of centrifugal force.

6. An impeller comprising a pair of adjacent rotary members having overlying, substantially radially extending peripheral, faces which so engage as to allow centrifugal force to operate on and move outward any matter located between them where they engage, one of said members being flexible and biased to position relatively to the other by the action of centrifugal force.

7. An impeller comprising a pair of adjacent rotary members having coöperating substantially radial faces at their peripheries from between which centrifugal force will tend to throw any material supplied thereto, one of said members being flexible and biased to position relatively to the other by the action of centrifugal force.

8. An impeller comprising a pair of adjacent rotary members having coöperating substantially radial faces at their peripheries from between which centrifugal force will tend to throw any material supplied thereto, one of said members being laterally yieldable and biased to position relatively to the other by the action of centrifugal force.

In witness whereof I have hereunto set my hand at Enterprise, Kansas, this 28 day of March, 1912.

W. J. EHRSAM.

Witnesses to the signature of William J. Ehrsam:
    TILLIE EURICH,
    E. F. MEADER.

In witness whereof I have hereunto set my hand at Lawrence, Kansas, this 14th day of February, 1912.

LAWRENCE N. MORSCHER.

Witnesses to the signature of Lawrence N. Morscher:
    J. H. MITCHELL,
    BERTHA L. ZIMMERMAN.

---

Copies of this patent may be obtained for five cents each, by addressing the "Commissioner of Patents, Washington, D. C."